United States Patent Office 2,802,858
Patented Aug. 13, 1957

2,802,858

PHTHALIC ESTERS OF IMPROVED COLOR AND METHOD

Aaron Stack, Park Forest, and Earl G. Shaver, Chicago, Ill., assignors to The Sherwin-Williams Company, Cleveland, Ohio, a corporation of Ohio No Drawing. Application April, 14, 1954,
Serial No. 423,228

7 Claims. (Cl. 260—475)

This invention relates to a method of improving the achromatic character of plasticizing phthalic acid and phthalic anhydride esters.

More particularly, this invention relates to a method of making water white esters of phthalic anhydride and phthalic acid with mono-alcohols which are insoluble in water and contain not more than about 20 carbon atoms. The invention is directed primarily to the dihexyl through distearyl esters of phthalic anhydride and phthalic acid. As these esters are used extensively for plasticizers in moulding compositions, films and the protective and decorative coating field it is important that the colors be as nearly water white as it is possible to produce them.

Normally esterifications of this nature are carried out by esterifying the phthalic source and the selected alcohols in the presence of a water insoluble solvent of which toluene and xylene are common examples. The esterifying reaction is carried on at elevated temperatures and the reflux of the solvent assists in carrying water formed as a result of the esterification reaction over into an offset condenser and water trap. The water of reaction is condensed and collected in the trap and assisted in its removal from the reaction zone by means of the refluxing solvent. The lighter solvent floats on top of the water collected and is continually returned after condensation to the reaction zone.

The use of a solvent process for the production of esters is well known and needs no expansive discussion. It is usually an advantage of solvent reflux method of esterification to obtain products of lighter color. However, users of plasticizers are particularly concerned about color and the sole use of the solvent reflux processing technique is not sufficient to produce the quality of product demanded by the trade. Heretofore in the art, it has been usual to subject the products of the esterification reaction to treatment with various color body absorbents illustrated by activated charcoal, fuller's earth, etc. and to steam-treat the product under high vacuum in an attempt to remove color bodies from the formed esters.

It is also usual in producing commercial esters of the class herein described to include in the reaction an esterification catalyst which may be sulfuric acid, but more often an organic sulfonic acid, to increase the speed of the reaction to a practical degree. We prefer to use toluene sulfonic acid containing about 80% of the monohydrate in its crystalline form. Obviously other esterification catalysts useful in the art may be substituted for the purposes indicated.

Various stratagems have been attempted in order to decrease the color bodies present in the completed ester. Both phthalic acid and phthalic anhydride were compared for possible variation in result. The alcohol employed has been freshly distilled before its inclusion in the ester reaction. Attempts were also made to treat the ester products with activated charcoal using a progressively increasing quantity of the absorptive ingredient. None of the usual techniques proved to be of significant value.

It is the object of this invention, therefore, to provide a means for enhancing the achromatic characteristics of phthalic acid esters.

Other objects will appear as the description of the invention is developed.

Improvement in the achromatic color characteristics of phthalic acid esters of water insoluble mono-alcohols has been obtained by the following method:

The selected alcohol to be used in the esterification reaction is weighed into a solvent carrier, e. g. toluene, benzene, xylene, etc. Into a suitable reaction vessel equipped with agitator, thermometer, reflux column and water trap, from 5% to not above 30% of water is weighed out based on the quantity by weight of the phthalic acid component to be reacted in the esterification mixture. The esterification catalyst is dissolved or dispersed in water and the water-catalyst mixture incorporated into the alcohol-solvent mixture contained in the reaction vessel. The requisite quantity of phthalic anhydride or phthalic acid is weighed out and transferred to the reaction vessel. The reaction mixture is then subjected to heating and reflux will start usually at about 90° C., dependent in part on the nature and proportion of volatile solvent included in the reaction vessel. Reflux is continued and the water carried over by the volatilized solvent caught in the water trap beneath the reflux condenser. As the quantity of water in the reaction mass is continuously removed the temperature of the distilland increases to about 130° C. and should not be allowed to exceed 150° C. After the theoretical amount of water has been collected in the side-arm trap, excess solvent is removed from the crude ester by steam distillation under vacuum conditions. Excess acid that may be present is neutralized and the product washed with water and a small amount of activated carbon is included during the purification step. If the added water is eliminated from the reaction, colors of from 100 to 200 Hazen are common. However, by the addition of a quantity of water of the order previously indicated, the achromatic quality of the resultant ester is greatly enhanced and colors of 20 to 25 Hazen can be produced with little difficulty. The standard method for determining Hazen color will be found in a book published by the American Public Health Association entitled "Standard Methods for the Examination of Water and Sewerage, 9th edition, 1947" (pages 14 and 15).

Alcohols useful for the purposes of this invention are those which are insoluble in water and include hexyl alcohol, heptyl alcohol, octyl alcohol, isooctyl alcohol, benzyl alcohol, nonyl alcohol, decyl alcohol, isodecyl alcohol, lauryl alcohol, stearyl alcohol, etc. Trial runs made with polyhydric alcohols in the formation of alkyds, for example, glycerine, have been made with water added but found ineffective in reducing the color of oil-modified alkyd resins.

Phthalic acid and phthalic anhydride are useful for the purposes of the invention. Phthalic anhydride is most often employed as it is more readily available commercially.

While the following examples are not exhaustive, the use of the inventive procedure is illustrated by a number of examples.

*Example 1*

| | Parts |
|---|---|
| Isooctyl alcohol | 572 |
| Toluene | 572 |
| Paratoluene sulfonic acid crystals (80% paratoluene sulfonic acid) | 4 |
| Water | 50 |
| Phthalic anhydride | 296 |

The alcohol and toluene were mixed together and transferred to a three-neck reaction vessel fitted with a condenser, Dean-Stark trap, agitator and thermometer. The toluene sulfonic acid catalyst was dissolved in the water and included in the reactants. Thereafter phthalic anhydride was added and upon heating, the reactants started to reflux at 93° C. After 4 hours, during which time the temperature of the distilland increased to 130° C., 87 parts of water were collected in the water trap. The toluene was thereafter stripped off under vacuum of 25 inches. Excess acidity was neutralized with aqueous caustic soda solution and 0.4 part activated charcoal (Nuchar) stirred in prior to filtration. The diisooctyl phthalate obtained had color of 20 Hazen.

*Example II*

The same as in Example I with the exception that added water was eliminated. Processing conditions were comparative. Final color—50 Hazen.

*Example III*

|  | Parts |
|---|---|
| Capryl alcohol | 604 |
| Toluene | 600 |
| Sulfuric acid (98% grade) | 2 |
| Water | 32 |
| Phthalic anhydride | 296 |

Into equipment as described in Example I were first weighed the alcohol and toluene. The sulfuric acid was added to the water separately and the diluted acid catalyst stirred into the alcohol-toluene mixture. Thereafter the phthalic anhydride was added and the reaction mass heated to a maximum of 128° C. The toluene was stripped off under a vacuum of 28 inches and a temperature of 110° C. Color of product was 30 Hazen after neutralizing and washing in the presence of 0.8 part activated carbon (Nuchar).

*Example IV*

A control test, utilizing the same materials and quantities of materials as in Example III was made with the exception being the elimination of the water added prior to esterification. Process conditions were comparable. Color of product was 150 Hazen.

*Example V*

|  | Parts |
|---|---|
| Decyl alcohol | 700 |
| Toluene | 700 |
| Toluene sulfonic acid crystals | 10 |
| Water | 70 |
| Phthalic anhydride | 296 | were weighed into a reaction vessel as described in Example I and heated. Temperature during esterification did not exceed 125° C. Color—40 Hazen.

*Example VI*

Example V was repeated, but the water added prior to esterification eliminated for control purposes. Color of diester product—150 Hazen.

*Example VII*

|  | Parts |
|---|---|
| Capryl alcohol | 604 |
| Toluene | 604 |
| Paratoluene sulfonic acid crystals | 10 |
| Phthalic acid | 332 | were esterified using the general procedure outlined in the preceding examples. The esterification product was recovered in the illustrated manner. Color was 150 Hazen.

The example illustrates that using phthalic acid in lieu of phthalic anhydride does not overcome the color problem.

*Example VIII*

Example VII was repeated, except 32 parts of water were included in the reaction mass prior to esterification. No activated charcoal was used (as in Example VII) and yet the color was reduced to 25 Hazen.

*Example IX*

|  | Parts |
|---|---|
| Stearyl (octadecanol-1) alcohol | 700 |
| Xylene | 700 |
| Toluene sulfonic acid crystals | 10 |
| Water | 100 |
| Phthalic anhydride | 400 | were refluxed until the water obtained in the side-arm water trap was equivalent to 46 parts by weight. The product was washed with dilute alkali and the solvent removed under 28 inches vacuum. The color was less than 40 Hazen Other alcohols of monohydric nature, including mixtures of those of different chain length, were similarly esterified. Color was improved in each instance when from not less than 7% to not above 40% and preferably 10 to 20% of water, based upon the weight of phthalic anhydride, was used in the reaction and present prior to the start of the esterification reaction. At 7% and below one does not obtain optimum color improvement. Higher percentages produce no advantage, but are disadvantageous as longer periods are required to obtain similar yields of diester.

As stated, paratoluene sulfonic acid is employed as esterification catalyst. Other esterification catalysts may be used in lieu thereof and include mixed alkane sulfonic acids, sulfuric acid, sulfamic acid, etc. Of the available esterification catalysts, paratoluene sulfonic acid is readily available, is satisfactory in its effect upon the rate of esterification and is easily and readily removed after it has served its purpose. A catalyst is essential in this esterification reaction in reducing the time to a practical schedule of operation. Normally from about 0.3% to 1% of paratoluene sulfonic acid is a convenient amount and if sulfuric acid is employed 0.1% to 0.25% is within an operative range of usefulness.

Having thus described our improvement in method of manufacture of plasticizer esters leading to products of improved color, what we claim is:

1. In the process of esterification of phthalic anhydride with mono-alcohols insoluble in water containing not more than about 18 carbon atoms under refluxing solvent at atmospheric pressure and below to produce plasticizing esters, the improvement in process which comprises the addition, prior to esterification, of a quantity of water to the reactant mixture of in excess of 5% but not more than about 30% based on the phthalic acid but sufficient to enhance the achromatic characteristics of the resultant ester produced and completing the said esterification reaction by removal of added water and water of reaction.

2. In the process of esterification at atmospheric pressure and below of phthalic anhydride with water insoluble aliphatic mono-alcohols containing not more than about 18 carbon atoms to form neutral plasticizer esters, the improvement in process which comprises the addition of not less than 7% nor more than about 30% by weight of said acid component of water to the reactant mixture prior to esterification under solvent reflux conditions at a temperature within a range of from 90° to about 150° C. and completing the said esterification reaction by removal of added water and water of reaction.

3. In the method of production of phthalic esters by catalytic condensation of orthophthalic acid with a water insoluble aliphatic mono-alcohol containing not more than about 18 carbon atoms under solvent reflux at atmospheric pressure and below, improvement in method which comprises initial addition of from 7% to not more than about 30% by weight of said acid component of water and completing the said esterification reaction by removal of added water and water of reaction.

4. In the method of producing phthalic esters for plasticizers by catalytic condensation of an acid selected from a group consisting of orthophthalic acid, and orthophthalic anhydride with an aliphatic mono-alcohol containing from 6 to 18 carbon atoms under water insoluble solvent reflux at a temperature not exceeding 150° C. and a pressure not exceeding atmospheric, the improvement in method which comprises adding water to said reactants prior to esterification in a quantity of from 10% to about 20% by weight based upon the acid component present and completing the said esterification reaction by removal of added water and water of reaction.

5. As in claim 3, wherein the mono-alcohol is octyl alcohol.

6. As in claim 3, wherein the mono-alcohol is capryl alcohol.

7. As in claim 3, wherein the mono-alcohol is decyl alcohol.

References Cited in the file of this patent

UNITED STATES PATENTS

| | | |
|---|---|---|
| 2,147,488 | Hickman et al. | Feb. 14, 1939 |
| 2,459,014 | Cavanaugh et al. | Jan. 11, 1949 |